Patented Dec. 30, 1941

2,267,855

UNITED STATES PATENT OFFICE 2,267,855

TREATMENT OF WELLS PRODUCING MINERAL FLUID

Leonard C. Chamberlain, Midland, Mich., assignor to The Dow Chemical Company, Midland, Mich., a corporation of Michigan No Drawing. Application March 15, 1937, Serial No. 131,020

4 Claims. (Cl. 166—21)

The invention relates to the treatment of oil wells yielding water or brine along with the oil. It more particularly concerns an improved method of preventing water or brine infiltration without substantially affecting the flow of oil.

A commercially available method of preventing such water infiltration without substantially affecting the flow of oil in wells consists in injecting into the formation a solution, in a solvent immiscible with water, of a material which yields a water-insoluble deposit when the solution becomes mixed with water in the water-bearing pores in the formation. Such water-immiscible solutions may be, and often are, miscible with oil. Typical examples of water shut-off solutions of the kind in question are: solutions of a silicon-halogen or titanium-halogen compound, e. g. $SiCl_4$, $TiCl_4$, in oil; sulphur monochloride in oil; mixtures of sulphur and sulphur monochloride in oil. When such solutions are brought into contact with well waters, precipitation of a water-insoluble deposit occurs, which acts to stop up water-bearing pores in the formation. The principal advantage in employing a solution of this type lies in the fact that in contact with the oil in the oil-bearing portions of the formation no material precipitation occurs. The solution, therefore, is selective in its plugging action, shutting off water without substantially affecting the flow of oil to the well. However, I have found that, when such solution is injected into the formation, it tends to enter the oil-bearing portions thereof with greater facility than those bearing water or brine. Hence, in attempting to shut off water by employing such solutions it is usually necessary to inject into the formation a considerably larger volume of the solution than that calculated to close the water pores, because a relatively large proportion of the solution enters the oil-bearing pores of the formation and therein is wasted. In some instances all the solution may enter the oil-bearing pores rather than those bearing water and a successful water shut-off cannot be obtained.

I have now found that by injecting into the formation ahead of such plugging solutions as the aforesaid a liquid capable of forming with water a solution substantially free from solid suspended matter and of substantially lower surface tension than that of water, a materially greater proportion of the solution enters the water-bearing portions of the formation, thus reducing the proportion of plugging solution which is normally wasted in the oil-bearing portions of the formation. The invention, then, consists of the method hereinafter fully described and particularly pointed out in the claims.

In the treatment contemplated by my process I inject into the formation producing the oil and water a liquid of non-acid character which is capable of absorbing water and producing therewith a non-acid aqueous solution substantially free from solid suspended matter and having a substantially lower surface tension than that of water. Examples of suitable liquids for the purpose are: the water-soluble alcohols, such as methyl, ethyl, propyl, butyl, and isopropyl alcohol; water-soluble ketones such as methyl ethyl ketone, acetone; the water-soluble phenols, cresols, xylenols, and the like; and aqueous solutions of the above, which in absorbing water form aqueous solutions of non-acid character exhibiting a substantially lower surface tension than that of water itself. The amount of such liquid to be employed largely depends upon the degree of permeability of the formation and the extent to which it is to be treated. For example, I have found that from about 5 to 500 gallons or more may be employed with beneficial results. After the liquid is injected, I inject into the formation under suitable pressure a plugging solution, which is immiscible with water, in amount suitable to effect plugging of the water-bearing pores in the formation. For this purpose, I may employ any solution which is substantially immiscible with water that is capable of forming in contact with water a water-insoluble precipitate. Examples of such solutions are given above. The pressure is maintained upon the solution for a time to allow it to intermingle with the well waters in the formation. The pressure is then released and the well put into production.

The following example is illustrative of one mode of carrying out the invention in a well provided with the usual casing and tubing. The well is shut down, and a packer is placed around the tubing, preferably at the top of the producing formation, sealing the annular space between the tubing and the well bore. A quantity of a non-acid liquid capable of forming with water a solution substantially free from solid suspended matter and of substantially lower surface tension than that of water is introduced into the well through the tubing and thence into the formation, pressure being applied to the liquid, if necessary, by forcing in an additional quantity thereof or by forcing a gas into the tubing or by introducing into the tubing the plugging solution as in the next step in the process. After the foregoing liquid is injected into the formation, a quantity of a substantially water-immiscible solution forming a water-insoluble deposit in contact with water is introduced into the tubing and forced into the formation under pressure in amount sufficient to effect plugging of the water-bearing pores. After a time, the pressure is released and the well is put into production.

The method has the advantage of facilitating the introduction into water-bearing pores of an oil-producing formation yielding water of a larger proportion of a water-immiscible solution capable of forming a plugging deposit on contacting water and of reducing the proportion thereof which normally enters oil-bearing pores, where it is wasted.

Other modes of applying the principle of my invention may be employed instead of the one explained, change being made as regards the method herein disclosed, provided the steps stated by any of the following claims or the equivalent of such stated steps be employed.

I therefore particularly point out and distinctly claim as my invention:

1. In a method of treating a formation yielding both oil and water or brine to effect a reduction of water or brine inflow without substantially reducing the flow of oil to the well, the steps which consist in introducing into the well and thence into the formation a water-soluble surface tension lowering non-acid liquid agent and thereafter a substantially water-immiscible solution, said solution hydrolyzing upon contact with water to form a water-insoluble precipitate capable of stopping the water- or brine-producing pores in the formation.

2. In a method according to claim 1 wherein the water-immiscible solution is miscible with oil.

3. In a method of treating a formation yielding both oil and water or brine to effect a reduction of water or brine inflow without substantially reducing the flow of oil to the well, the steps which consist in introducing into the well and thence into the formation of a water-soluble surface tension lowering non-acid alcohol, and then introducing into the well and thence into the formation a substantially water-immiscible solution, said solution hydrolyzing upon contact with water to form a water-insoluble precipitate capable of stopping the water- or brine-producing pores in the formation.

4. In a method according to claim 3 wherein the water-immiscible solution is miscible with oil.

LEONARD C. CHAMBERLAIN.